June 8, 1926.

A. C. THOMSEN 1,588,065

TRACTION DEVICE

Filed March 18, 1925

Fig. 1.

Fig. 2.

Inventor

A.C. Thomsen.

By Arthur H. Sturges.

Attorney

Patented June 8, 1926.

1,588,065

UNITED STATES PATENT OFFICE.

ARTHUR C. THOMSEN, OF OMAHA, NEBRASKA.

TRACTION DEVICE.

Application filed March 18, 1925. Serial No. 16,540.

The present invention relates to traction devices for the wheels of motor vehicles to assist them in self propulsion through sand, mud, mud holes and the like.

On sandy roads, such as found in Western Nebraska and desert country, the wheels of automobiles sink deeply in the sand and very frequently become stuck not only on account of loss of traction, but because there is not sufficient supporting area to the tread surface of the tire. In these instances, and where deep mud and slimy clay are encountered, it is necessary to support the vehicle and to propel it at the same time. It is the primary object of this invention to provide a device capable of meeting the above and like conditions of travel of a motor vehicle, and to make such device in the nature of an attachment which may be removed when not required.

Another object of this invention is to provide a traction device which increases the transverse tractive surface of the wheel; which provides additional supporting or bearing surfaces for the wheel to maintain it from sinking to deeply in sand, mud, snow and the like; and which may be applied to wheels of the present day type without modifying the construction of the wheels.

Another object of the present invention is to provide a traction device which greatly increases the tractive surface of the wheel by projecting laterally from the opposite sides thereof, but which lies substantially flat across the tread surface of the tire to admit application of the device to wheels of automobiles where the mud guard and running board are in close proximity to the peripheral surface of the tire. This structural condition is found in a number of motor vehicles, particularly in the Ford type of automobile, and traction devices and mud hooks which are at present known are not well adapted as they cannot pass through the restricted space between the tire and the rear end of the running board. The present invention therefore aims to overcome this practical difficulty and provide a traction device capable of application to wheels of all types of automobiles whether said space is large or small, and which at the same time secures all of the benefits of a broad and wide tractive surface to offer the necessary resistance and to sustain the wheel from sinking in the sand and mire.

Another feature of the present invention is to provide a device of this character which, when in place on a wheel, is firmly set against vibration, wobbling and accidental displacement and which, while providing relatively long lateral projections does not bind against the weak side walls of the tire and does not depend upon the same for support but leaves the tire free to flex and respond to exterior distorting pressures.

A still further object of the invention is to provide a traction device which for the most part projects from the opposite sides of the wheel and which has but a small relatively flat portion extending across the tread surface of the tire so that the device is substantially out of the way when the wheel travels over a hard flat surfaced roadway, and the device need not be removed after emerging from each sand and mud hole but may be left in place while traveling over a road in which these chock holes have formed at various intervals.

The invention also aims at the provision of a traction device embodying all of the above recited characteristics, and which has laterally extending wings imparting an extended bearing surface to support the wheel and chain links which lie across the tread of the tire to brace the wings; certain of the links being large to provide paddles or propulsion surfaces which increase the traction of the wheel, and the link or links which lie at the periphery of the tire being flat so that they may pass freely through the small space between the tire and the rear end of the running board where the latter meets the forward end of the rear mud guard.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary side elevation of a rear wheel of a motor vehicle having a traction device constructed according to the present invention applied thereto, and showing the relative positions of the running board and the rear mud guard with respect to the wheel, and Figure 2 is a fragmentary enlarged transverse section taken through a portion of the wheel with its tire and other parts, and showing the device of the invention in position thereon.

Referring to the drawing 10 designates a wheel body shown in the present instance as of the artillery type although the invention may by slight modification be adapted to various types of wheels and conditions met with in application and use.

The wheel body 10 has the usual felly 11 which carries a tire receiving rim 12. In the present instance the rim 12 is shown as of the clincher type having the oppositely facing clincher flanges 13 beneath which are removably engaged the beads 14 of a pneumatic tire 15 or the like which is of common present day construction. The tire 15 is provided with a tread portion 16 adapted to engage the roadway for supporting the wheel 10 and for obtaining the required traction for the propulsion of the vehicle.

As shown in Figure 1 the wheel 10 has the usual mud guard 17 arched upwardly over the wheel and which at its forward end extends downwardly into substantially horizontal alinement with the axle 18 upon which the wheel 10 may be mounted. The forward end of the mud guard 17 meets the rear end of the running board 19 at the point 20, and as is usual, the space 21 between the tread 16 of the tire and the point of juncture 20 between the mud guard and the running board is relatively narrow as the wheel 10 is not susceptible to any relative longitudinal displacement with respect to the running board 19 but is free only to move vertically beneath the mud guard 17.

In the construction and application of traction, anti-skid, and like devices which are adapted for temporary application to the tires 15 and wheels 10, it is essential to bear in mind that the space 21 is relatively narrow so that upon the ordinary loose play of the traction devices, such devices or parts thereof will not strike the mud guard 17 or running board 19, injuring the same or the traction devices when the wheel 10 is operated.

The present traction device is therefore designed to take care of these difficulties in construction and application, and use and to combine therewith all of the hereinbefore enumerated advantages in a comparatively simple and strong structure comprising essentially but two parts, a body part, and a retaining part. The body part of the traction device comprising, in the present instance, a single length of strap metal which is bent to provide, at its intermediate portion, a bridge or connecting piece 22 of suitable width to fit between adjacent spokes of the wheel 10 and of suitable length to extend entirely across the inner face of the felly 11. The body part is bent down at opposite ends of the bridge piece 22 to lie flat and bear against the opposite sides or edges of the felly 11 for maintaining the bridge piece 22 from sliding laterally through the wheel. The body strap is stepped outwardly from the opposite edges of the felly 11 to form shoulders 23 adapted to rest upon and conform to the curvature of the opposite edges of the clincher rim 12 to further support and brace the body part upon the wheel. From the edges of the rim 12 the ends of the strap are diverged slightly in substantially straight lines to form outwardly flaring arms 24 which are spaced apart sufficiently to normally lie out of contact with the sides of the tire 15 to permit the tire to flex under normal conditions without engaging the arms 24 and chafing or otherwise injuring the side walls of the tire. These arms 24 project outwardly a distance which is short of the tread 16 of the tire so that the outer ends of the arms will be not only raised from the surface over which the tire rolls, but also spaced rearwardly from the running board 19 to remain out of contact therewith and so as not to strike the mud guard 17. The outer extremities of the arms 24 are turned outwardly in opposite directions away from each other to provide wings or paddles 25 and the same are given substantial width so as to offer the necessary resistance or pressure to mud, sand and the like with which they may be engaged to assist in supporting the wheel 10 and maintaining it from sinking or settling in the road.

Suitably secured upon the wings or paddles 25 by means of rivets or welding are mounted the blades 25" which are adapted to assist the propulsion of the vehicle through mud in a horizontal direction.

The holding or retaining part of the device may comprise a short chain as shown having an intermediate link 26 arranged to lie flat across the surface of the tread 16 of the tire to project but a relatively short distance beyond the tread and to thus freely enter the space 21 between the wheel and the running board 19. The opposite ends of the link 26 are connected to a pair of relatively heavy links 27 which extends outwardly and lie axially at right angles to the middle link 26 to present the broad sides of the links 27 to the mud, sand or the like and serve as propelling paddles with considerable bearing surfaces.

The outer ends of the links 27 are connected by short links 28 or the like to eye bolts 29 the threaded shanks of which are passed upwardly through the wings 25 and adjustably held therethrough by clamping nuts 30. The nuts 30 are preferably of the wing type so that they may be conveniently positioned and removed for quickly adjusting the device to the wheel and tire. The chain and the eye bolts 29 are of such lengths as to bind the chain tightly across the tread 16 of the tire and to draw the body part or strap of the device firmly over the wheel and rim. This prevents looseness and vibration incident to the operation of the wheel. The strap part is given sufficient thickness and width to hold it against edgewise rocking and to impart sufficient strength thereto for preventing the arms 24 from binding against the opposite sides of the tire 15 when the nuts 30 are turned up on the bolts 29. There is thus sufficient play between the arms 24 and the chain for the free flexing of the tire 15. The device projects to a considerable distance, practically beyond the opposite sides of the tire and adjacent to but spaced inwardly from the tread portion 16 thereof to engage mud, sand and the like when the wheel enters ruts and holes in the roadway, or enters sand, mud or other substances met with during travel. The wings 30 and adjacent parts are so located that when the wheel is driven over a normal road where the tire 15 does not sink into the same, the laterally projecting parts of the device do not contact with the road but are held by the tread 16 up out of engagement therewith. The advantage of such an arrangement is that the device need not be rapidly removed from the wheel between bad stretches of road.

The arms 24, however, possess sufficient resiliency to be flexed outwardly with the tire 15 when the tread 16 of the tire is flattened to an excessive extent and where the connecting chain is moved toward a straight line position. The shoulders 23 assist in maintaining the strap or body portion of the device firmly in place and from rocking or wabbling into contact with the opposite sides of the tire.

I do not wish to be restricted to the size, form, and proportions of the various parts, and obviously changes could be made in the construction herein described without departing from the spirit of the invention, it being only necessary that such changes fall within the scope of the appended claims.

What is claimed is:—

1. A traction device for wheels comprising a body strap bent upon itself with an intermediate bridge portion adapted to engage across the felly of a wheel between the spokes thereof and having outwardly diverging arms adapted to lie at opposite sides of a tire beyond the normal widest portion thereof and having outturned wings on the ends of said arms spaced inwardly a short distance from the tread of the tire, and a connecting chain detachably secured to said wings and arranged to extend across the tread of the tire for holding the strap portion in place.

2. A traction device for wheels comprising a strap bent substantially U-shaped and arranged to engage between adjacent spokes of a wheel and against the opposite sides of the felly, rim and tire of the wheel, said strap having its outer ends bent outwardly to provide wings which are located adjacent to and inwardly of the tread of the tire for aiding in supporting the wheel in soft material, and a connecting member extending across the tread portion of the tire and secured to said wings for holding the strap in place and having a relatively flat intermediate part at the tread surface of the tire and provided at opposite sides of said part with paddle portions of considerable area adapted to engage in the soft material and aid in the propulsion of the vehicle.

3. A traction device for automobile wheels comprising a U-shaped strap adapted to be placed through a wheel between adjacent spokes thereof and having an intermediate bridge portion adapted to fit the felly of the wheel and stepped shoulders arranged to fit against the opposite edges of the tire flange of the wheel, said strap having diverging arms adapted to normally lie in spaced relation from the side walls of the tire and terminating near the tread of the tire in outturned wings located inwardly of the tread of the tire, said wings being relatively broad to provide supporting surfaces to assist in the support of the vehicle, and a connecting chain adjustably and detachably secured at opposite ends to said wings and having an intermediate link arranged to lie flat upon the tread surface of the tire and provided with relatively large links of broad surface area extending axially at right angles to the intermediate links to form paddles at opposite sides of the tire tread to engage in soft roadway material and assist in the propulsion of the vehicle.

In testimony whereof, I have affixed my signature.

ARTHUR C. THOMSEN.